March 2, 1971 W. J. HALPERN ET AL 3,566,691
DUAL ELEMENT WELL ASSEMBLY
Filed April 10, 1969 2 Sheets-Sheet 1
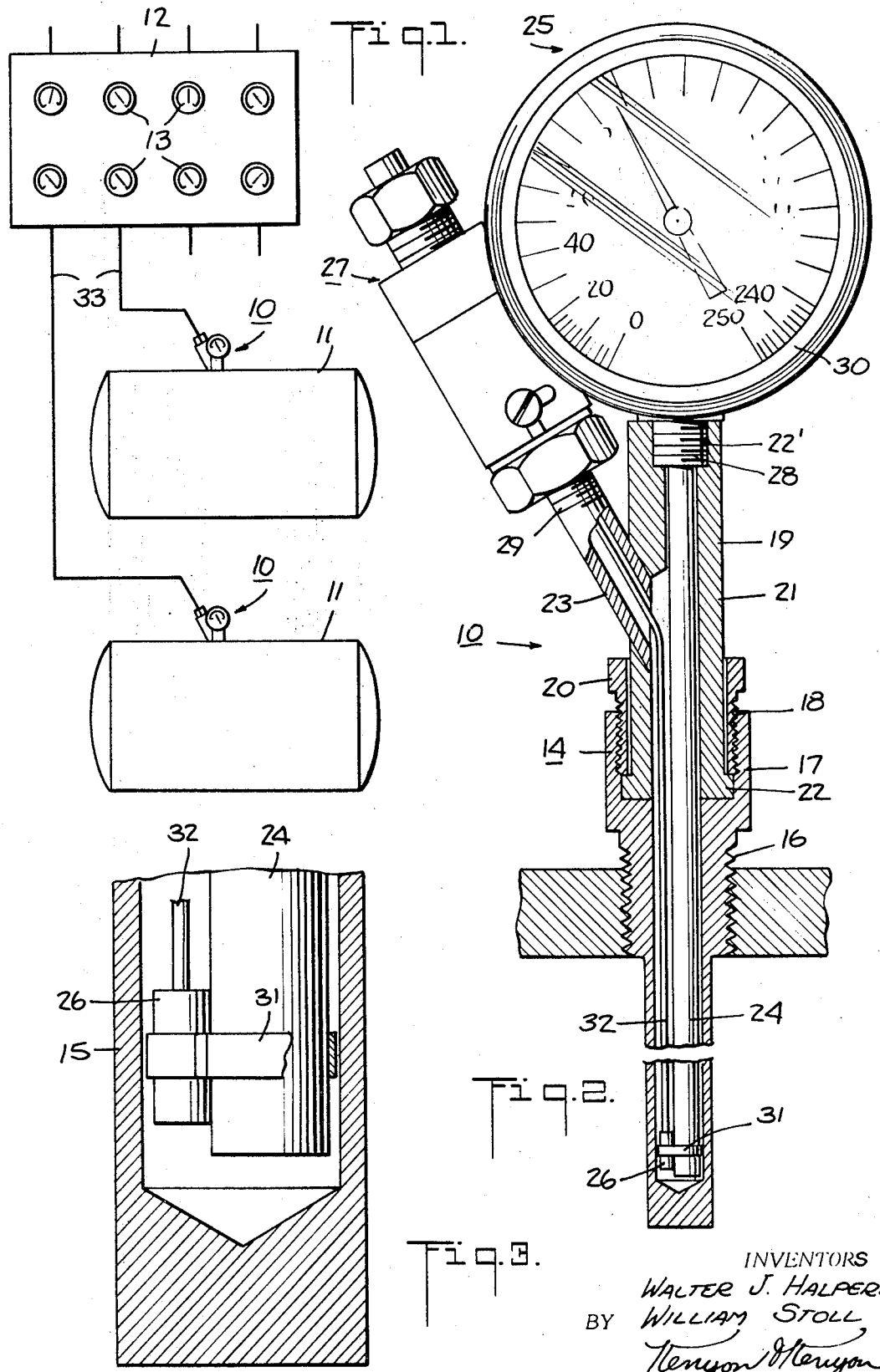
INVENTORS
WALTER J. HALPERN
BY WILLIAM STOLL
Kenyon & Kenyon
ATTORNEYS

United States Patent Office 3,566,691
Patented Mar. 2, 1971

3,566,691
DUAL ELEMENT WELL ASSEMBLY
Walter J. Halpern, Forest Hills, and William Stoll, East Meadow, N.Y., assignors to Moeller Instrument Company Inc., Richmond Hill, N.Y.
Filed Apr. 10, 1969, Ser. No. 815,534
Int. Cl. G01k 5/32, 7/00
U.S. Cl. 73—343                                  15 Claims

ABSTRACT OF THE DISCLOSURE

The thermometer and remote temperature detector are both mounted within a well assembly such as within a boiler or gear box structure with the detector secured by the retaining band to the base of the thermometer stem. The detector leads out to a remote indicator so that the temperature detected by the thermometer can be read at a remote point from the thermometer.

---

This invention relates to a mounting for a thermometer. More particularly, this invention relates to a mounting for a thermometer and remote read-out detector associated with the thermometer.

Heretofore, it has been known to mount various types of thermometers within structures such as boilers so as to determine the temperature of the boiler. However, in many instances, the thermometers have been placed in positions which have been obstructed from view. In these instances, it has been particularly difficult to read the thermometer dial so as to determine the temperature of the boiler. In other instances, the thermometers have been positioned at places which have not had easy access, for example, due to relatively high temperatures surrounding the installation in which the thermometers have been placed. In order to avoid these difficulties, various thermometers have been constructed so that the dial faces can be rotated into any number of planes, for example, as described in U.S. Pat. 3,357,251, for visual viewing. In addition, in those situations where the surrounding environment has prevented viewing by personnel close at hand, e.g. due to excessive heat, various remote read-out means have been associated with the thermometers. However, in these instances, the remote read-out means have usually been separately mounted from the thermometer in the installation being thermally measured. For example, while a thermometer is mounted within an opening to extend into an installation such as a boiler, the remote read-out means has also been mounted in a second opening to extend into the installation to cooperate with the thermometer. Because of these separate mountings, it has been difficult to always accurately connect the read-out means to the thermometer with the result that the readings taken from the read-out means have not always been accurate. Further, the separate mountings require duplication of sealing means in sealing the required openings against leakage into or out of the various installations being thermally measured.

Accordingly, it is an object of this invention to provide a remote read-out for a thermometer which accurately indicates the temperature detected by the thermometer.

It is another object of the invention to provide a remote read-out for a thermometer which is mounted at the same point as the thermometer.

It is another object of the invention to provide a means of mounting a thermometer and a remote read-out means at the same point within a structure to be tested.

Briefly, the invention provides a dual element well assembly which is constructed so as to mount the stem of a dial thermometer as well as a remote read-out detector of a read-out means within the same position. The well assembly includes a well which is formed with a hollow elongated socket to receive the thermometer stem and read-out detector, a connection piece which is mounted at the end of the socket to separately mount the thermometer and a distributor assembly of the read-out means and a means which locks the connection piece in the socket to form a unitary structure.

The well is further formed with a mounting means such as an exteriorly threaded section so as to permit mounting of the socket within an installation such as a boiler.

In order to physically connect the remote read-out detector to the dial thermometer, the lower end of the thermometer stem is placed in contact with the remote temperature detector, for example, by a retaining band which holds the detector to the stem. In this way, the temperature which is imposed upon the thermometer stem is also imposed upon the remote temperature detector. The thermometer stem further passes directly to a dial portion mounted on the connecting piece in which a dial face is located for indicating the detected temperature so as to provide a local read-out. The remote temperature is however, connected, for example, by two or three wires of suitable material and construction to the distributor assembly mounted on the connecting piece and via the distributor assembly to a dial situated at some point distant from the well assembly.

By placing the remote temperature detector at the same point as the thermometer stem, an efficient temperature reading can be obtained at a remote station. Furthermore, by constructing the well assembly with a single socket, both the thermometer and read-out detector can be easily threaded into the interior of a structure to be thermally measured such as a boiler or gear box. Furthermore, the remote temperature detector can be easily connected to a read-out dial at a point remote from the boiler.

These and other objects and advantages of the invention will become more apparent from the following detailed description and appended claims taken in conjunction with the accompanying drawings in which:

FIG. 1 illustrates a schematic view of a number of dual element well assemblies according to the invention mounted in different installations and connected to a remote read-out panel;

FIG. 2 illustrates a fragmentary cross-sectional view of a dual element well assembly according to the invention;

FIG. 3 illustrates a fragmentary cross-sectional view of the connection between the remote temperature detector and the thermometer stem according to the invention.

Figure 4:
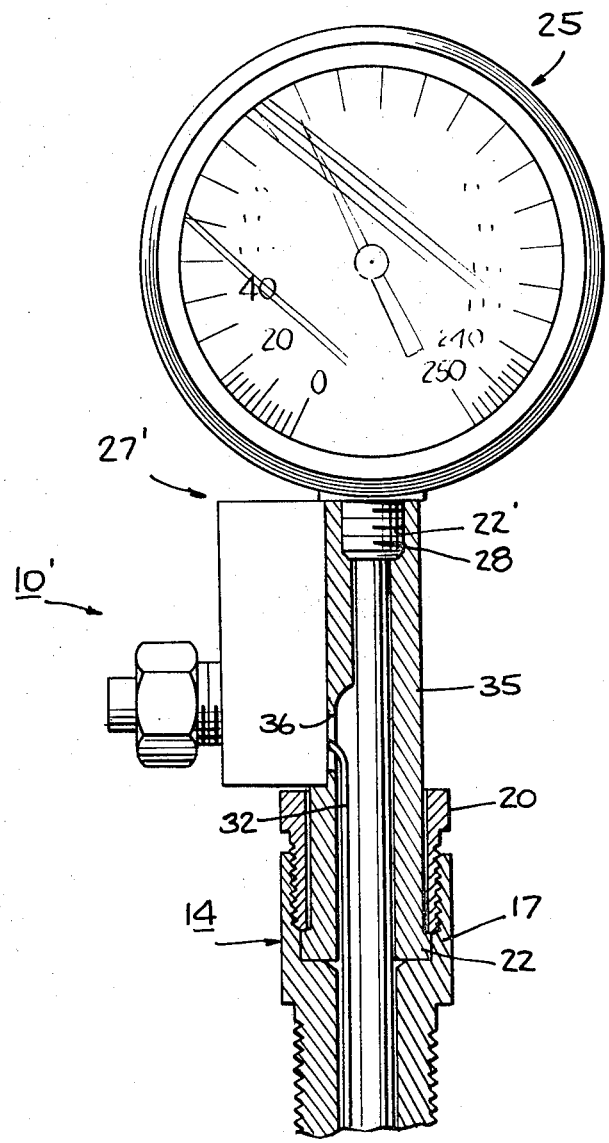
FIG. 4 illustrates a fragmentary view of a modified dual element well assembly of the invention.

Referring to FIG. 1, a plurality of dual element well assemblies 10 are installed in a pair of structures, for example, boilers 11, and are each connected as is known to a remote panel 12 containing a plurality of read-out dials 13 so that the temperatures of the individual boilers 11 can be read off individual dials 13.

Referring to FIG. 2, each dual element well assembly 10 comprises a well 14 of tubular metal construction which includes a hollow elongated socket 15, an intermediate exteriorly threaded section 16 for securing the well 14 within a boiler 11, and an upper end 17 which is provided with internal threads 18. In addition, each well assembly 10 includes a connecting piece 19 which is mounted within the upper end 17 of the well 14 and held in place by a means such as a threaded swivel nut 20. The connecting piece 19 comprises a tubular member 21 of substantially cylindrical shape which is coaxial with the elongated section of the socket 15 and which contains an annular flange 22 at the base. The tubular member 21 is provided at the top with an internal thread 22' for purposes as hereinafter described. In addition, the connecting piece 19 includes a hollow offset 23 of cylindrical shape which is inclined at an angle to the axis of the socket and secured to the tubular member 21 as by a force fit or welding. The offset 23 is tubular in cross-section and communicates directly with the bore on the tubular member 21.

The socket 15 of the well 10 is sized to receive a stem 24 of a thermometer 25 such as a bimetallic thermometer as well as a remote temperature detector 26 of a remote read-out means of known construction. Likewise, the tubular member 21 is sized to threadably receive a mounting thread 28 of the thermometer 25 so as to fixedly hold the thermometer 25 in place within the well assembly 10 and the offset 23 is sized to threadably receive a distributor assembly 27 of the read-out means on an external thread 29. The thermometer 25 also has a dial portion 30 which is useful as a local read-out for the detected temperature.

Referring to FIG. 3, the remote temperature detector 26 is secured to the lower end of the dial thermometer stem 24 by a retaining band 31 which encircles and clips the detector 26 to the dial thermometer stem 24 in intimate contact with each other.

Referring to FIG. 2, in order to relay the detected temperature, the remote tempreature detector 26, for example, having an element rating of 120 ohms at 0° C., is connected by a pair of wires 32, as is known, to the distributor assembly 27 threadably secured to the offset 23 of the connecting piece 19 of the well assembly 10. These wires 32 are further insulated as by polytetrafluorethylene known under the trademark Teflon. This distributor assembly 27 is further connected as is known by suitable leads 33 (FIG. 1) to a respective dial 13 on the remote panel 12 of the read-out means.

In order to utilize the dual element well assembly 10, the well 14 is threadably secured into a boiler 11, as shown in FIG. 2. Thereafter, the dial thermometer 25 is threaded into the tubular member 21 while the member 21 is maintained out of the upper end 17 of the well 14. In addition, the remote temperature detector 26 is fed through the offset 23 and clipped by the retaining band 31 to the bottom of the thermometer stem 24 with the wires 32 leading out of the offset 23 and the distributor assembly 27 is threaded onto the offset 23. Next, the secured together dial thermometer stem and detector 26 are moved into the well 14 until the tubular member 21 seats on the bottom of the upper end 17. Next, the threaded hexagonal screw 20 is threaded down into the upper end 17 until coming into contact with the flange 22 on the tubular member 21. In this manner, the connecting piece 19 becomes secured within the upper end 17 of the well 14 and the bottom end of the thermometer stem 24 and remote temperature detector 26 are securely positioned in place. With the lead wires 32 of the detector 26 properly secured in place in the distribtuor assembly 27 and the distributor assembly connected to a dial 13 of a remote panel 12, the dual element well assembly 10 is ready for use.

Referring to FIG. 4, wherein like reference characters have been used to indicate like parts as above, the dual element well assembly 10' can be provided with a modified connecting piece 34 and distributor assembly 27'. In this instance, the connecting piece 34 comprises a tubular member 35 similar to that described above which has an opening 36 is a side wall for passage of the wires 32 out of the connecting piece 34. In addition, the distributor assembly 27', such as a standard amphenol or Cannon plug, is secured to the tubular member 35 in communication with the opening 36 in order to receive the ends of the wires 32. This distributor assembly 27' further is constructed to form a connection between the wires 32 and the leads 33 (FIG. 1) of the remote panel dials. Alternatively, an ordinary receptacle or other means of housing a distributor assembly for two or three wire connections can be used instead of an amphenol or Cannon plug.

The invention thus provides a simple efficient manner of mounting a dial thermometer in an installation, such as a boiler, with a remote temperature detector so that the temperature at the point at which the dial thermometer is mounted in the boiler can be read at a remote point. Furthermore, this manner of mounting a detector and thermometer is readily efficient since the point of measurement is at the same point for both the read-out detector and the thermometer. Also, since both are mounted at the same time, the time and labor which is required for mounting of the detector with respect to the thermometer is reduced while the accuracy of the placement of the detector with respect to the thermometer is ensured.

The invention further provides a unit which can be easily constructed and assembled in order to properly mount a dial thermometer and remote temperature detector in position.

It is further noted that the invention provides a dual element well assembly which is made up of relatively few parts which can be readily assembly and taken apart. Furthermore, in order to properly ensure that there is an efficient thermal gradient between the temperature detector and thermometer, both the thermometer and detector can be immersed within a fluid within the well of the dual element well assembly. In this way, the assembly can be maintained in a cooled state and will not become subjected to severe temperature stresses.

What is claimed is:

1. A dual element well assembly comprising:
   a well including an elongated socket for receiving a thermometer stem of a thermometer and a remote temperature detector of a read-out means therein, said stem and said detector being in adjacent relation, said read-out means including a distributor assembly in fixed position with respect to said stem and said detector, said assembly distributing temperature information as sensed by said detector, said well further including an exteriorly threaded section for securing said well to an installation to be thermally measured;
   a connecting piece secured to said well for removably mounting the thermometer thereon and for removably mounting said distributor assembly of the read-out means thereon in spaced relation to the thermometer; and
   means for securing said connecting piece in said well at the upper end thereof.

2. A dual element well assembly as set forth in claim 1 wherein said connecting piece has a flange seated in said well and said means includes a threaded screw threadably mounted in said well in contact with said flange.

3. A dual element well assembly comprising:
   a well for receiving a thermometer stem of a thermometer and a remote temperature detector of a read-out means therein said stem and said detector being in adjacent relation, said read-out means including a distribution assembly in fixed position with respect to said stem and said detector, said assembly distributing temperature information as sensed by said detector, and
   a connecting piece secured to said well for removably mounting the thermometer thereon and for removably mounting said distribution assembly of the read-out means thereon in spaced relation to the thermometer, said connecting piece including a tubular member coaxial of said well and an offset secured in said tubular member, said tubular member having a bore for passage of the thermometer stem and said offset having a bore for passage of a pair of wires from the detector to the distributor assembly of the read-out means.

4. A dual element well assembly as set forth in claim 3 which further comprises a means for removably securing said connecting piece in said well.

5. A dual element well assembly comprising:
  a well for receiving a thermometer stem of a thermometer and a remote temperature detector of a read-out means therein said stem and said detector being in adjacent relation, said read-out means including a distribution assembly in fixed position with respect to said stem and said detector, said assembly distributing temperature information as sensed by said detector, and
  a connecting piece means secured to said well for removably mounting the thermometer thereon and for removably mounting said distribution assembly of the read-out means thereon in spaced relation to the thermometer, said connecting piece means including a tubular member coaxial of said well having an opening in the side thereof for passage of a plurality of wires from the detector to the distributor assembly of the read-out means and a bore for passage of the thermometer stem.

6. The combination of a dual element well assembly having a well containing an elongated socket, and a connecting piece mounted on said well and containing a tubular member coaxial with said socket and having an opening in the side thereof; a thermometer secured to said tubular member and having a stem extending through said tubular member into said socket; a distributor assembly of a readout means secured to said connecting piece in communication with said opening; a temperature detector adjacent to the lower end of said thermometer stem; and means communicating said detector with said distributor assembly through said opening to relay a detected temperature to said distributor assembly.

7. A dual element well assembly comprising
  a well having a socket for receiving a thermometer stem and a remote temperature detector therein,
  a connecting piece having a tubular member received in said well, said tubular member having a bore passing therethrough in communication with said socket and an offset secured to said tubular member and having a bore passing therethrough at an angle to said bore of said tubular member and in communication with said bore of said tubular means, and
  means securing said tubular member in said well.

8. A dual element well assembly as set forth in claim 7 wherein said well includes an exteriorly threaded section for securing said well in an installation to be thermally measured.

9. A dual element well assembly as set forth in claim 7 wherein said tubular member has an exterior flange thereon and said means is removably mounted in said well in contact with said flange.

10. A dual element well assembly as set forth in claim 9 wherein said means is threadably mounted in said well.

11. The combination of a dual element well assembly having a well containing an elongated socket, and a connecting piece mounted on said well and containing a tubular member coaxial with said socket ad having an opening in the side thereof; a thermometer secured to said tubular member and having a stem extending through said tubular member into said socket; a distributor assembly of a read-out means secured to said connecting piece in communication with said opening; a temperature detector secured to the lower end of said thermometer stem; and means communicating said detector with said distributor assembly through said opening to relay a detected temperature to said distributor assembly.

12. The combination as set forth in claim 11 wherein said connecting piece further includes a hollow offset secured at an angle to said tubular member in communication with said opening in said tubular member and said distributor assembly is secured to said offset.

13. The combination as set forth in claim 11 which further comprises means for removably securing said connecting piece in said well.

14. The combination as set forth in claim 13 wherein said connecting piece has a flange received in said well and said means is threadably mounted in said well in overlying contact with said flange.

15. The combination as set forth in claim 11 which further includes a retaining band securing said detector to said stem.

References Cited
UNITED STATES PATENTS

| | | | |
|---|---|---|---|
| 1,367,026 | 2/1921 | Drinker | 73—343 |
| 2,007,324 | 7/1935 | Budgett | 73—343 |
| 2,383,756 | 8/1945 | Williams | 73—1 |
| 2,652,725 | 9/1953 | Lamb | 73—343 |
| 2,713,265 | 7/1955 | Lamb et al. | 73—340 |
| 3,281,518 | 10/1966 | Stroud | 73—343 |

S. CLEMENT SWISHER, Primary Examiner

D. E. CORR, Assistant Examiner

U.S. Cl. X.R.

73—344